United States Patent [19]

Svensson

[11] Patent Number: 4,634,299
[45] Date of Patent: Jan. 6, 1987

[54] ARRANGEMENT FOR AN AXLE AND A METHOD OF MOUNTING A BEARING ON THE AXLE

[75] Inventor: Everth Svensson, Åtvidaberg, Sweden

[73] Assignee: Schaktfirma Broderna Svensson AB., Tvidaberg, Sweden

[21] Appl. No.: 752,199

[22] PCT Filed: Nov. 14, 1984

[86] PCT No.: PCT/SE84/00385
§ 371 Date: Jun. 20, 1985
§ 102(e) Date: Jun. 20, 1985

[87] PCT Pub. No.: WO85/02236
PCT Pub. Date: May 23, 1985

[30] Foreign Application Priority Data

Nov. 15, 1983 [SE] Sweden ............................. 8306273-7

[51] Int. Cl.[4] ...................... F16C 25/00; F16C 23/04; F16B 2/14
[52] U.S. Cl. .................................. 384/271; 384/206; 403/371
[58] Field of Search ............... 384/428, 154, 157, 192, 384/206–210, 267, 271, 272, 295, 441; 403/370, 371, 374, 259, 119

[56] References Cited

U.S. PATENT DOCUMENTS

| | | | |
|---|---|---|---|
| 1,483,282 | 2/1924 | Coston | 384/295 X |
| 1,667,610 | 4/1928 | Tewsley | 384/271 |
| 3,163,474 | 12/1964 | Wilson | 384/206 X |
| 3,347,577 | 10/1967 | Carlson et al. | 403/371 X |
| 3,432,214 | 3/1969 | Cashman et al. | 384/441 X |
| 3,841,771 | 10/1974 | Shankwitz et al. | 403/370 X |
| 4,022,536 | 5/1977 | Piepho et al. | 403/370 X |

Primary Examiner—Stuart S. Levy
Assistant Examiner—Thomas R. Hannon
Attorney, Agent, or Firm—Hayes, Davis & Soloway

[57] ABSTRACT

The present invention relates to an arrangement for an axle (4) which is anchored at two points situated at the ends of the axle (4), preferably in mounting cheeks (1, 2) or the like provided with through-bores (5, 6) for the axle (4). Anchoring is accomplished by nuts (7, 8) which can be screwed on outside the fixing points. On a central cylindrical part (9) the axle is designed to have a bearing (10) mounted on it which is fixed by spacer elements (11, 12) disposed on the axle (4) and bridging the distance between the respective fixing points and the bearing (10).

According to the invention one (11) of the spacer elements (11, 12) is disposed fixed relative to the cylindrical part (9) of the axle (4). The arrangement comprises two expanding sleeves (13, 14) which can be inserted in the through-bores (5, 6) and have inwardly-facing and-/or outwardly-facing conical shaping. In a zone (16, 17) at the respective fixing points the axle (4) and/or the through-bores (5, 6) have corresponding conical shaping so that the respective expanding sleeves (13, 14) act as annular wedges with their apex pointing towards the cylindrical part (9), so that by use of associated nuts (7, 8) the respective expanding sleeves (13, 14) can be caused to expand against or be pressed in by the wall of the through-bores (5, 6), thereby accomplishing the anchoring of the axle (4).

5 Claims, 4 Drawing Figures

ARRANGEMENT FOR AN AXLE AND A METHOD OF MOUNTING A BEARING ON THE AXLE

The present invention relates to an arrangement for an axle which is anchored at two points situated at the ends of the axle, preferably in mounting cheeks or the like with through-bores for the axle, by means of nuts which can be screwed on outside the fixing points, and which is designed to have a bearing mounted on a central cylindrical part, this bearing being fixed by means of spacer elements disposed on the axle, and bridging the distance between the respective fixing points and the bearing. The invention also relates to a method of mounting a bearing on an axle using the arrangement according to the invention.

The conventional way to achieve pivotability in a connection between two machine parts is to use a hinge journalled in bearings, comprising one or more bearings arranged on an axle which is fixed in between a pair of mounting cheeks or the like on one of the machine parts. The inner race of the bearing or bearings is disposed on the axle and, possibly with the aid of distancing rings, bridges the distance between the fixing cheeks, while the outer race of the bearing or bearings is effectively connected to the second machine part. Since relative movement between the inner bearing race and the axle produces progressively increasing wear resulting in excessive play and perhaps fracture of the axle, the race has to be fixed relative to the axle by means of nuts screwed onto the respective axle ends. It is important that the nuts are tightened just the right amount, since excessive tightening may jeopardize the attachment of the mounting cheeks, and excessive play may arise as a result of insufficient tightening, with the results mentioned above.

Hinges of this kind, journalled in bearings, are very common. As an example, reference is made to FIG. 1 on which the points where such bearing-mounted hinges occur are marked on an illustration of the hydraulic arm of a loading machine. The fixing of pulley wheels for a hoisting rope and the like can be regarded as a hinge mounted in bearings, and it will be appreciated what the results of the axle fracturing would be in this case. Even if the axle does not actually fracture, it is a laborious and costly process to renovate a bearing-mounted hinge to deal with wear and looseness.

The object of the present invention is to provide an arrangement for an axle for a bearing-mounted hinge by means of which very stable fixing of the inner race of the bearing can be obtained, thereby preventing the disadvantages described above.

This is made possible in that one of the spacer elements is disposed fixed relative to the cylindrical part of the axle, the arrangement comprises two expanding sleeves which can be inserted in the said through-bores and have inwardly or outwardly facing conical shaping, and the axle and/or the through-bores have corresponding conical shaping over a zone at the respective fixing points so that the respective expanding sleeves act as annular wedges with their apex pointing towards the cylindrical part, i.e. so that by means of associated nuts the respective expanding sleeves can be caused to expand against or be pressed together by the wall of the through-bore, thereby accomplishing the anchoring of the axle.

In order to achieve secure mounting of the axle relative to the mounting cheeks, according to the invention between the nut and the mounting cheek a sleeve is put on the axle end which is situated furthest away from the spacer element which is rigidly fixed on the axle, the dimensions of this sleeve being such that, without the associated expanding sleeve being influenced when the nut is tightened, it is braced against the mounting cheek so that the inner race of the bearing is thereby clamped between the fixed spacer element on one side and a spacer element on the other side, resting loosely against the mounting cheek and designed to fill the gap and eliminate looseness between the inner bearing race and the mounting cheek, the second axle end is then anchored by means of as associated expanding sleeve by tightening the associated nut, the sleeve is removed, and finally the first-named axle end is anchored in the same way as the second axle end.

The invention will be further explained in the following with reference to the accompanying drawing on which, as already stated, FIG. 1 shows the hydraulic arm of a loading machine with the points marked where there is a bearing-mounted hinge.

Figure 1:
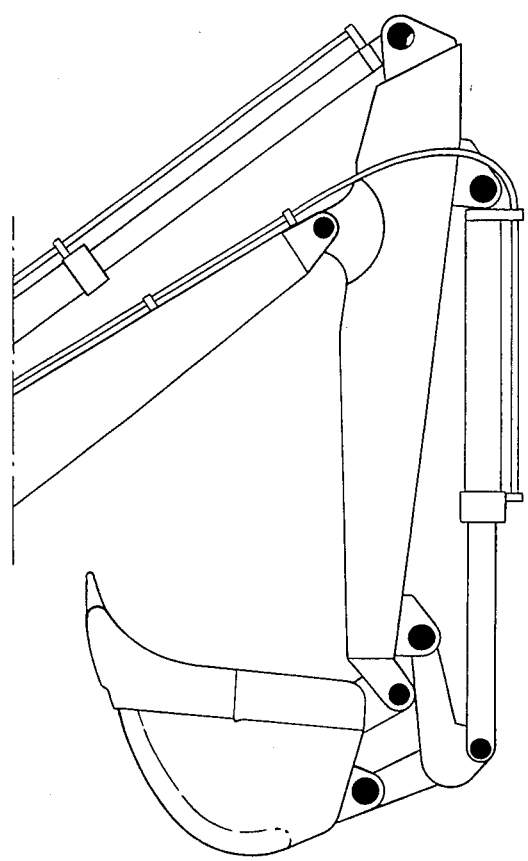

In the drawings, 1 and 2 are the designations of two mounting cheeks which are provided on a machine part 3. An axle 4 is passed through through-bores 5, 6 in the mounting cheeks 1, 2 and fixed relative to them by means of two nuts 7, 8 screwed on the axle 4 outside the mounting cheeks 1, 2. On a central cylindrical part 9 the axle 4 has a bearing 10 mounted on it. The space between this bearing and the respective mounting cheeks 1, 2 is bridged by spacer elements 11, 12.

Figure 3:
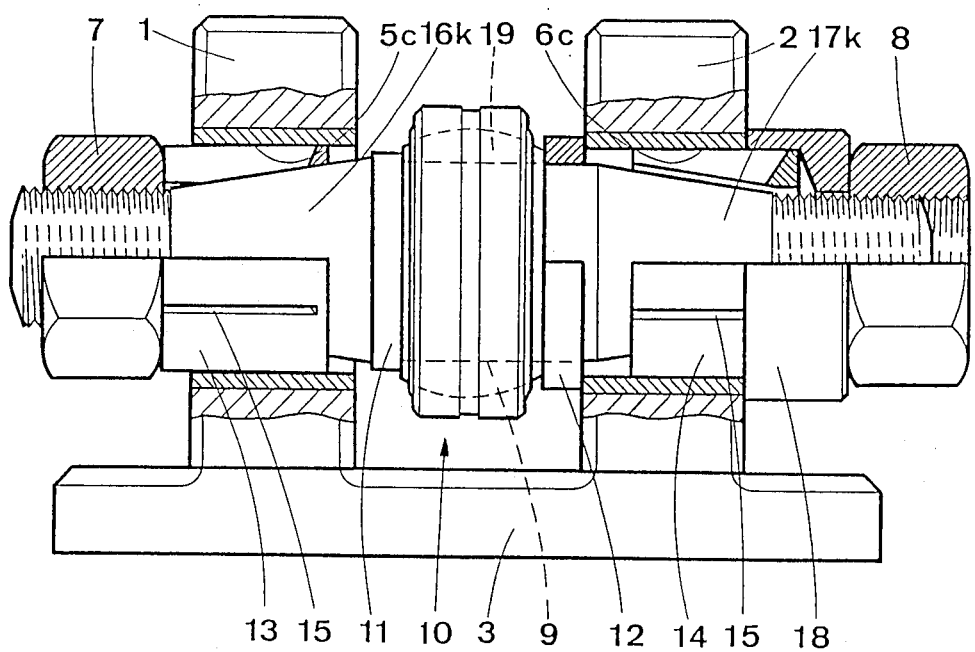
FIG. 3 is a view like that in FIG. 1, showing how a bearing is mounted according to the invention with the aid of a spacer sleeve.
Figure 2:
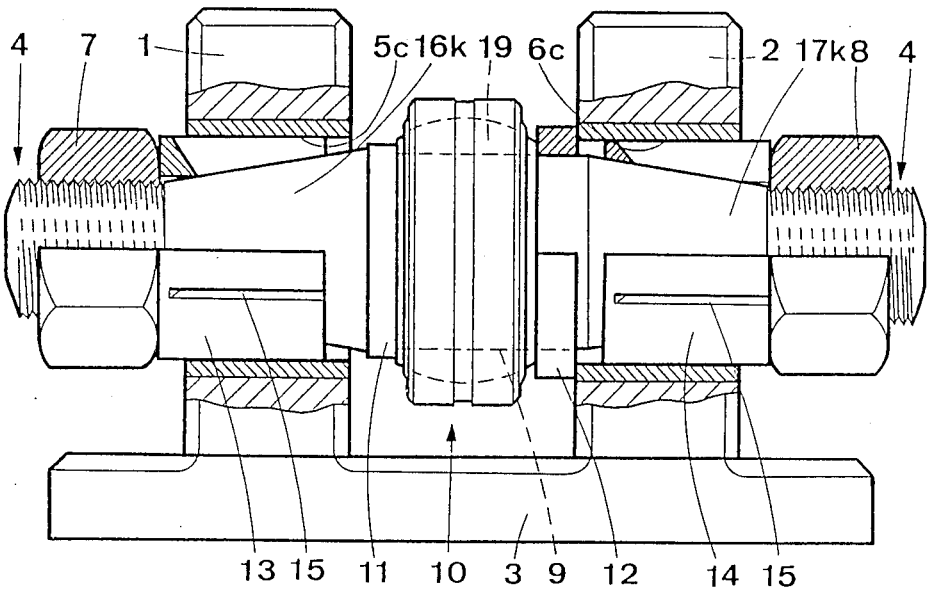
FIG. 2 shows schematically a side view, partially sectioned, of an embodiment of an arrangement according to the invention.

According to the invention one of the spacer elements, that which is designated by the numeral 11 in FIG. 2, is disposed fixed relative to the cylindrical part 9 of the axle 4. Furthermore, the arrangement according to the invention comprises two expanding sleeves 13, 14 which can be inserted in the through-bores 5, 6 and which have inwardly-facing or outwardly-facing conical shaping. On the embodiment shown in FIGS. 2 and 3 the conical shaping is inwardly-facing, while on the embodiment shown in FIG. 4 the conical shaping is outwardly-facing. In the first-named embodiment the axle 4 has corresponding conical shaping in the regions 16k and 17k respectively, while the through-bores 5c, 6c are cylindrical.

Figure 4:
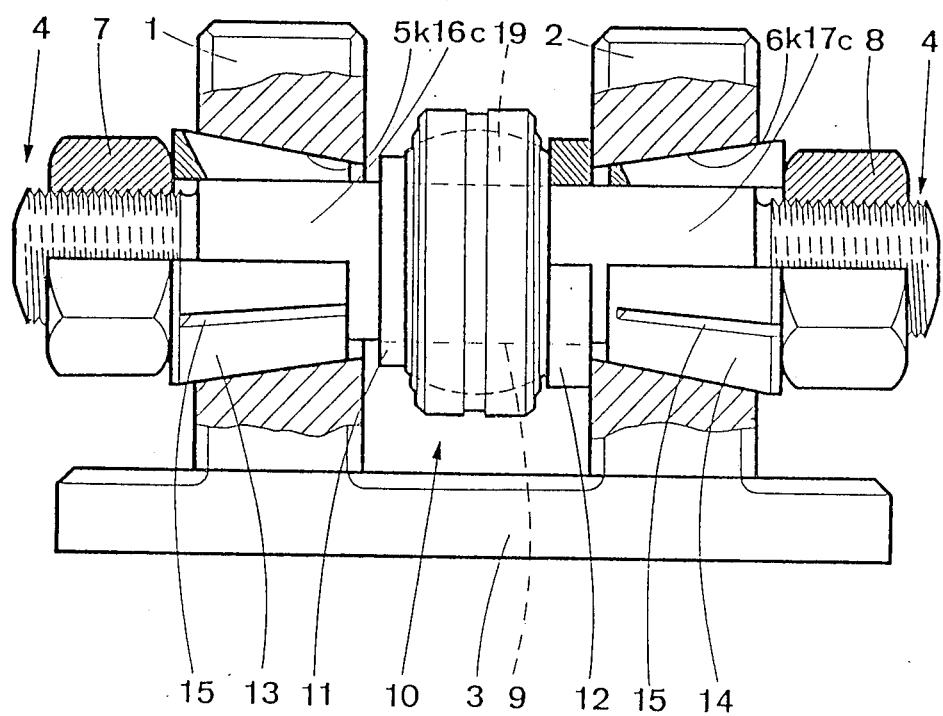
FIG. 4 shows schematically a side view, partially sectioned, of an alternative embodiment of an arrangement according to the invention.

In the second embodiment shown in FIG. 4 the zones 16c, 17c are cylindrical, while the through-bores 5k, 6k are made conical instead. The expanding sleeves 13, 14 are made with slits 15 and act as annular wedges, with their apex pointing towards the central cylindrical part 9. Anchoring of the axle 4 in the respective mounting cheeks 1, 2 is accomplished in the embodiment shown in FIG. 2 by causing the respective expanding sleeves 13, 14 to expand over the conical zones 16k, 17k of the axle 4 by means of the nuts 7, 8, so that the sleeves are pressed against the cylindrical walls of the through-bores 5c and 6c respectively. In an analogous way, with the embodiment shown in FIG. 4 anchoring of the axle 4 in the respective mounting cheeks 1, 2 is achieved by pressing the expanding sleeves 13, 14 against the cylindrical zones 16c, 17c on the axle via the conical walls of the through-bores 5k, 6k, by means of the nuts 7, 8. How this is accomplished will be explained in more detail in the following with reference to FIG. 3, in conjunction with an account of how the mounting of a bearing is effected.

For assembly, the axle 4 is passed on the right in the Figures, through the through-bores 5, 6 with the end of the axle which lies furthest away from the fixed spacer element 11 pointing forwards in the direction of movement. After the said axle end has been passed through the through-bore 5 the bearing 10 and the loose spacer element 12 are threaded over the axle in that order, after which the axle end is passed through the through-bore 6 so that it is finally located outside the mounting cheek 2. It will be appreciated that one prerequisite for the axle 4 being able to be pushed through the through-bore 5 is that the diameter of the fixed spacer element 11 should be less than the diameter of the through-bores 5, 6. A sleeve 18 is now threaded over the said end of the axle, and finally the nut 8 is screwed on and tightened. The sleeve 18 has an internal diameter such that the expanding sleeve 14 is not influenced when the nut 8 is tightened. What happens is that the fixed spacer element 11 presses the inner race 19 of the bearing and the loose spacer element 12 against the mounting cheek 2. The bearing 10 and the loose spacer element 12 are now located on the cylindrical part 9 of the axle 4. The nut is tightened sufficiently for the race 19 to be fixed properly without risk of deformation.

It is now expedient to anchor the axle 4 at the mounting cheek 1. This is effected as described above, by means of the nut 7 which is tightened so that the expanding sleeve 13 is pressed in over the conical zone 16k and is thereby expanded until it engages against the walls of the through-bore 5c. The nut 7 is tightened sufficiently for secure anchoring to be obtained.

The axle can now be anchored correspondingly in the mounting cheek 2. For this the first sleeve 18 is removed. After this the nut 8 is tightened in the same way as the nut 7.

It should be emphasised that the anchoring of the axle 4 in the mounting cheeks 1, 2 has been achieved according to the invention in such a way that no breaking force is applied at the points where the cheeks 1, 2 are attached to the machine part 3.

I claim:

1. An arrangement for an axle (4) which is anchored at two points situated at the ends of the axle (4), preferably in mounting cheeks (1, 2) or the like provided with through-bores (5, 6) for the axle (4), by means of nuts (7, 8) which can be screwed on outside the fixing points, and which is designed to have a bearing (10) mounted on a central cylindrical part (9), this bearing being fixed by means of spacer elements (11, 12) disposed on the axle (4) and bridging the distance between the respective fixing points and the bearing (10), characterized in that one (11) of the space elements (11, 12) is integral with the cylindrical part (9) of the axle (4), that the arrangement comprises two expanding sleeves (13, 14) which can be inserted in the said through-bores (5, 6) and have inwardly-facing conical shaping, and that the axle (4) has a corresponding conical shaping over a zone (16, 17) at the respective fixing points so that the respective expanding sleeves (13, 14) act as annular wedges with their apex pointing towards the cylindrical part (9), so that by means of the associated nut (7, 8) the respective expanding sleeves (13, 14) can be caused to expand against the wall of the through-bores (5, 6), thereby accomplishing the anchoring of the axle (4).

2. An arrangement for an axle (4) which is anchored at two points situated at the ends of the axle (4), preferably in mounting cheeks (1, 2) or the like provided with through-bores (5, 6) for the axle (4), by means of nuts (7, 8) which can be screwed on outside the fixing points, and which is designed to have a bearing (10) mounted on a central cylindrical part (9), this bearing being fixed by means of spacer elements (11, 12) disposed on the axle (4) and bridging the distance between the respective fixing points and the bearing (10), characterized in that one (11) of the space elements (11, 12) is integral with the cylindrical part (9) of the axle (4), that the arrangement comprises two expanding sleeves (13, 14) which can be inserted in the said through-bores (5, 6) and having outwardly facing conical shaping, and that the through-bores (5, 6) have corresponding conical shaping over a zone (16, 17) at the respective fixing points so that the respective expanding sleeves (13, 14) act as annular wedges with their apex pointing towards the cylidrical part (9), so that by means of the associated nut (7, 8) the respective expanding sleeves (13, 14) can be caused to be pressed together by the wall of the through-bores (5, 6), thereby accomplishing the anchoring of the axle (4).

3. A method of mounting a bearing (10) on an axle (4) which is anchored at two points situated at the ends of the axle (4), preferably in mounting cheeks (1, 2) or the like provided with through-bores (5, 6) for the axle (4), by means of nuts (7, 8) which can be screwed on outside the fixing points, and which is designed to have the bearing (10) mounted on a central cylindrical part (9), this bearing being fixed by means of spacer elements (11, 12) disposed on the axle (4) and bridging the distance between the respective fixing points and the bearing (10), one (11) of the space elements (11, 12) is integral with the cylindrical part (9) of the axle (4), and the arrangement comprises two expanding sleeves (13, 14) which can be inserted in the said through-bores (5, 6), comprising the steps of: placing between the nut (8) and the mounting cheek (2), a sleeve (18), on the end of the axle which is furthest away from the spacer element (11), the dimensions of this sleeve being such that, without influencing the associated expanding sleeve (14) when the nut (8) is tightened, it can be braced against the mounting cheek (2) so that the inner race (19) of the bearing (10) is thereby clamped between the fixed spacer element (11) on one side and the spacer element (12) resting loosely against the mounting cheek (2) on the other side, and designed to bridge the gap and eliminate looseness between the inner race (19) of the bearing (10) and the mounting cheek (2), the second end of the axle is then anchored by means of an associated expanding sleeve (13), by tightening the associated nut (7), the sleeve (18) is then removed, and finally the first-named end of the axle is anchored in the same way as the second end of the axle.

4. A method in accordance with claim 3, wherein said two expanding sleeves (13, 14) have inwardly facing conical shaping and said axle (4) has a corresponding conical shaping over the zone (16, 17) at the respective fixing points so that the respective expanding sleeves (13, 14) act as annular wedges with their apexes pointing toward the cylindrical part (9).

5. A method in accordance with claim 3, wherein said two expanding sleeves (13, 14) have outwardly facing conical shaping and the through-bores (5, 6) have corresponding conical shaping over the zone (16, 17) at the respective fixing points so that the respective expanding sleeves (13, 14) act as annular wedges with their apexes pointing toward the cylindrical part (9).

* * * * *